United States Patent
Ba

(10) Patent No.: US 9,292,473 B2
(45) Date of Patent: *Mar. 22, 2016

(54) PREDICTING A TIME OF FAILURE OF A DEVICE

(71) Applicant: International Business Machines Corporation, Armonk, NY (US)

(72) Inventor: Amadou Ba, Dublin (IE)

(73) Assignee: International Business Machines Corporation, Armonk, NY (US)

( * ) Notice: Subject to any disclaimer, the term of this patent is extended or adjusted under 35 U.S.C. 154(b) by 10 days.

This patent is subject to a terminal disclaimer.

(21) Appl. No.: 13/966,887

(22) Filed: Aug. 14, 2013

(65) Prior Publication Data

US 2014/0189440 A1 Jul. 3, 2014

Related U.S. Application Data

(63) Continuation of application No. 13/729,289, filed on Dec. 28, 2012.

(51) Int. Cl.
| | |
|---|---|
| G06F 11/00 | (2006.01) |
| G06F 17/00 | (2006.01) |
| G06F 11/34 | (2006.01) |
| G06F 11/22 | (2006.01) |
| G06F 11/30 | (2006.01) |
| G05B 19/4065 | (2006.01) |
| G05B 23/02 | (2006.01) |

(52) U.S. Cl.
CPC .............. *G06F 17/00* (2013.01); *G06F 11/008* (2013.01); *G06F 11/22* (2013.01); *G06F 11/3058* (2013.01); *G06F 11/3495* (2013.01); *G05B 19/4065* (2013.01); *G05B 23/0283* (2013.01)

(58) Field of Classification Search
USPC .......................................................... 702/34
See application file for complete search history.

(56) References Cited

U.S. PATENT DOCUMENTS

| | | | |
|---|---|---|---|
| 2,972,253 A | 2/1961 | Benson | |
| 6,865,513 B2 | 3/2005 | Ushiku et al. | |
| 7,024,335 B1 | 4/2006 | Parlos | |
| 7,512,847 B2 | 3/2009 | Bychkov et al. | |
| 7,598,712 B2 | 10/2009 | Zettel et al. | |
| 7,638,980 B2 | 12/2009 | Zettel et al. | |
| 7,974,822 B2 | 7/2011 | Ringering et al. | |
| 8,290,753 B2 * | 10/2012 | Tryon et al. ...................... 703/2 |

(Continued)

FOREIGN PATENT DOCUMENTS

| | | |
|---|---|---|
| EP | 2045682 A1 | 4/2009 |
| RU | 2361309 C1 | 7/2009 |

OTHER PUBLICATIONS

International Search Report together with the Written Opinion of the International Searching Authority from related International Application No. PCT/JP2013/006596, dated Jan. 14, 2014.

(Continued)

*Primary Examiner* — Sujoy Kundu
*Assistant Examiner* — Paul D Lee
(74) *Attorney, Agent, or Firm* — Scully, Scott, Murphy & Presser, P C.; Jeff Tang, Esq.

(57) ABSTRACT

The present disclosure relates generally to the field of predicting a time of failure of a device. In various examples, predicting a time of failure of a device may be implemented in the form of methods and/or algorithms.

12 Claims, 5 Drawing Sheets

(56) References Cited

U.S. PATENT DOCUMENTS

| | | |
|---|---|---|
| 2004/0187553 A1* | 9/2004 | Moriya et al. ............... 73/1.01 |
| 2006/0111857 A1 | 5/2006 | Shah et al. |
| 2008/0177613 A1 | 7/2008 | Chan et al. |
| 2009/0192735 A1* | 7/2009 | Horiuchi et al. ............. 702/58 |
| 2010/0085196 A1 | 4/2010 | Stiver et al. |
| 2010/0235121 A1 | 9/2010 | Constien et al. |
| 2011/0004419 A1 | 1/2011 | Ue et al. |
| 2011/0052224 A1 | 3/2011 | Yamashina et al. |
| 2011/0264323 A1 | 10/2011 | Sakakibara et al. |
| 2012/0179326 A1 | 7/2012 | Ghelam |

OTHER PUBLICATIONS

Michael Osterman et al, "Failure assessment software for circuit card assemblies", 1999 IEEE Proceedings Annual Reliability and Maintainability Symposium, pp. 269-276.

* cited by examiner

PREDICTING A TIME OF FAILURE OF A DEVICE

RELATED APPLICATION

This application is a continuation of U.S. Ser. No. 13/729,289, filed Dec. 28, 2012, the entire contents of which are incorporated herein by reference.

BACKGROUND

The present disclosure relates generally to the field of predicting a time of failure of a device.

In various examples, predicting a time of failure of a device may be implemented in the form of methods and/or algorithms.

DESCRIPTION OF RELATED ART

Devices are becoming increasingly complex. Various devices change dynamically in response to their mobility, changing execution environments and frequency of use. As a result, existing devices are typically prone to failures.

Certain existing failure prediction methods are based on, for example, on-line monitoring that considers both the actual state and the estimated (modeled) state of a system. Typically, those methods incorporate measurements of actual system parameters in order to evaluate the difference between the observed and the estimated (modeled) state which gives a residual. Then, the residual is monitored for the purpose of detecting significant deviation, that is, a failure indicator of the system.

However, such conventional failure prediction methods using continuous measurements to evaluate the state of systems are based on models reflecting the state of systems in their healthy case. This allows for assessing the presence or the absence of failure, but does not traditionally provide information about a time of failure.

Another conventional approach is based on laboratory accelerated tests. In this context, several stress tests and computer based simulations are performed and the failure of components and devices are consequently assessed.

During the stress tests the components making up the devices are subjected to tests in order to assess their performances and as a result predict their time of failure for a given environment. This is often used as a threshold to fix the duration of warranties when the devices are purchased.

However, a major issue with the conventional failure prediction methods based on stress tests is the fact that the stress tests are performed with fixed parameters under controlled environments. Those particular situations do not necessarily reflect the conditions in which the devices will operate; therefore the outcome of the stress tests is typically insufficient in assessing the actual status of devices in use (particularly when the devices are used in environments which are different from those in which the stress tests were conducted (that is, the change in operating condition adversely affects the predicted time of failure)).

SUMMARY

The present disclosure relates generally to the field of predicting a time of failure of a device.

In various examples, predicting a time of failure of a device may be implemented in the form of methods and/or algorithms.

In one embodiment, a method implemented in a device for predicting a time of failure of the device is provided, the method comprising: receiving by the device at least one laboratory test result; generating by the device at least one physical measurement associated with the device; determining by the device a difference between information associated with the at least one received laboratory test result and information associated with the at least one generated physical measurement; generating by the device a predicted time of failure of the device, wherein the generation of the predicted time of failure of the device is based at least in part upon the determined difference between the information associated with the at least one received laboratory test result and the information associated with the at least one generated physical measurement; and outputting by the device the predicted time of failure of the device.

BRIEF DESCRIPTION OF THE DRAWINGS

Various objects, features and advantages of the present invention will become apparent to one skilled in the art, in view of the following detailed description taken in combination with the attached drawings, in which.

DETAILED DESCRIPTION

Figure 1:
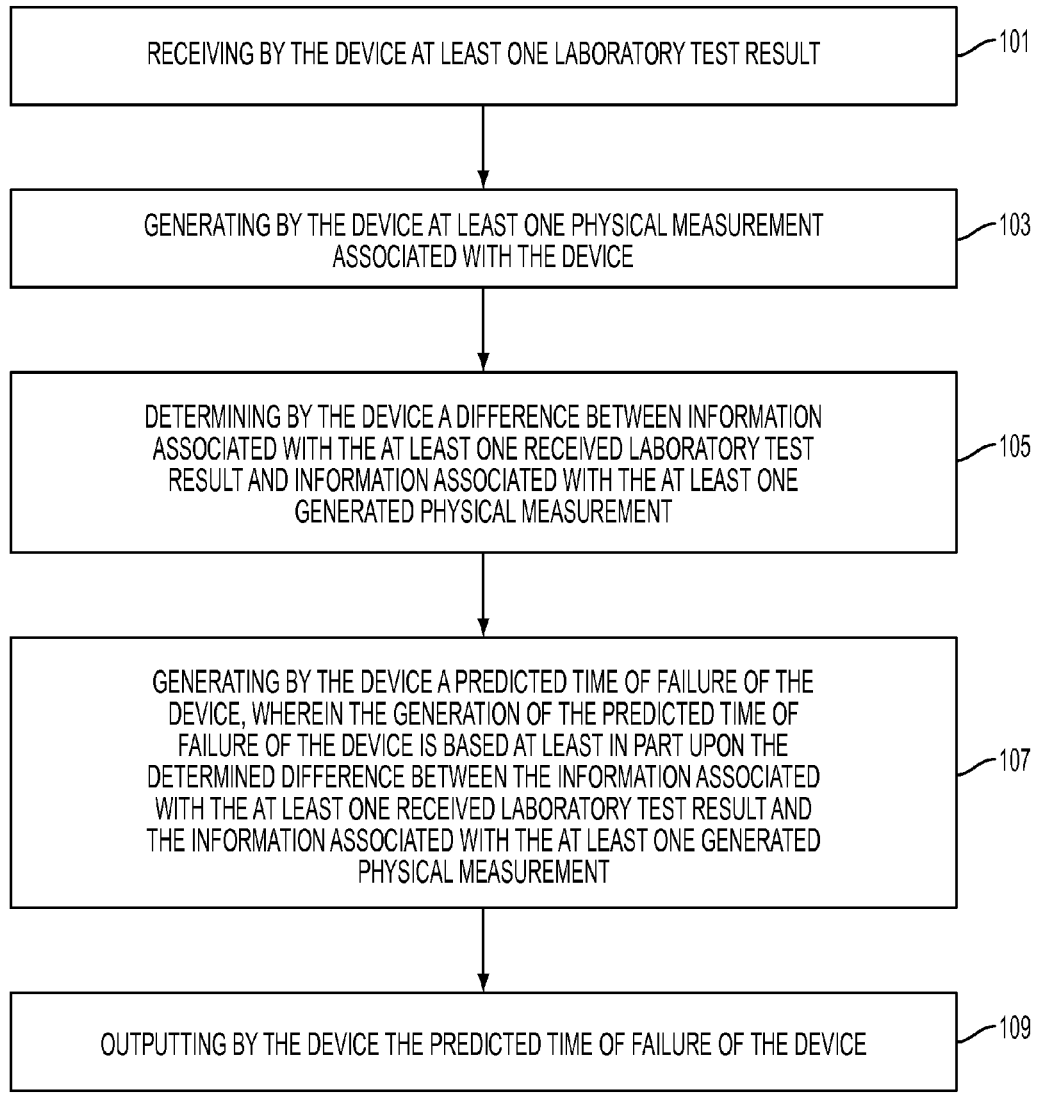
FIG. 1 depicts a flowchart of a method according to an embodiment of the present invention.

For the purposes of description, the term "real-time" is intended to refer to cause and effect occurring approximately contemporaneously in time (e.g., without significant time lag between cause and effect but not necessarily instantaneously).

For the purposes of description, the term "sensor" is intended to refer to a mechanism for acquiring one or more real-time measurements of one or more physical parameters. In various examples, a sensor may acquire measurements for temperature, current, voltage, acceleration, tension and/or electro-magnetic field.

For the purposes of description, the term "device" is intended to refer to any mechanism operating while using physical components (e.g., electrical, electronic, acoustic, hydraulic and/or mechanical components). Various examples of a "device" include (but are not limited to) the following: a smart phone (a mobile phone, a cellular phone); a tablet; a laptop computer; a desktop computer; a computer system, a household appliance (e.g., a refrigerator; a freezer; a washing machine, a dryer, a stove; a range; a hot water heater; a boiler; a furnace), a large commercial or industrial system.

For the purposes of description, the term "subsystem" is intended to refer to any one or more physical elements that form part of a larger physical system (which is comprised of a group of two or more independent but related subsystems).

For the purposes of description, the term "physical system" is intended to refer to a group of two or more independent but related subsystems.

For the purposes of description, the term "model" is intended to refer to a representation of a physical system or subsystem(s) as defined by one or more mathematical equations and/or as represented in one or more databases.

For the purposes of description, the term "stress test" is intended to refer to collecting one or more measurements related to a given subsystem when the subsystem is operated beyond normal operating conditions to a breaking point. This process permits gradual monitoring of performance degradation of the given subsystem to establish one or more thresholds (e.g., maximum life duration of the given subsystem).

For the purposes of description, the term "time of failure" is intended to refer to a specific time (e.g., a specific hour, a specific minute and/or a specific second) and/or a specific date (e.g., a specific year, a specific month and/or a specific day). In one example, time of failure may be provided as a specific time in the future (e.g., Jan. 1, 2018). In another example, time of failure may be provided as an offset from a current time (e.g., 22 days from now).

As described herein, mechanisms are provided for predicting and displaying a time of failure of a device by using a set of measurements. The failure prediction obtained from a processing system that establishes the diagnosis and the prognosis may be transferred to a display system that displays the predicted time of failure. In the case where the device does not have a display system, a display system may be added to those devices.

In another example, mechanisms may be provided to allow frequent updating of the predicted time of failure of the device and notifying the user of the outcome and the reasons for the failure by indicating the component(s) predicted as leading to the failure.

The devices may be embedded with sensors recording their actual dynamics. Also used in the prediction may be measurement data obtained from laboratory stress test(s). The prediction of the time of failure may be performed also by using various models and methods. Each model may be a physical based model and/or a data based model. The model selection may depend on the most appropriate one in representing the features of the system in question. Whatever the selected modeling approach, the complexity of the device and its highly integrated nature may require a multi-modeling method—where a device will be considered as a combination of different subsystems, and each subsystem behaves in accordance with a specific dynamic, and the overall model of a given device is the combination of each model of a subsystem.

Referring now to FIG. 1, a method implemented in a device, wherein the method is for predicting a time of failure of the device, is shown. As seen in this FIG. 1, the method may comprise: at step 101—receiving by the device at least one laboratory test result; step 103—generating by the device at least one physical measurement associated with the device; step 105—determining by the device a difference between information associated with the at least one received laboratory test result and information associated with the at least one generated physical measurement; step 107—generating by the device a predicted time of failure of the device, wherein the generation of the predicted time of failure of the device is based at least in part upon the determined difference between the information associated with the at least one received laboratory test result and the information associated with the at least one generated physical measurement; and step 109—outputting by the device the predicted time of failure of the device.

In one example, any steps may be carried out in the order recited or the steps may be carried out in another order.

Still referring to FIG. 1, any communications (e.g., receiving by the device at least one laboratory test result) may be carried out via a network. Such a network may comprise the Internet, an intranet, a local area network, a wide area network and/or any other desired communication channel(s).

Figure 2:
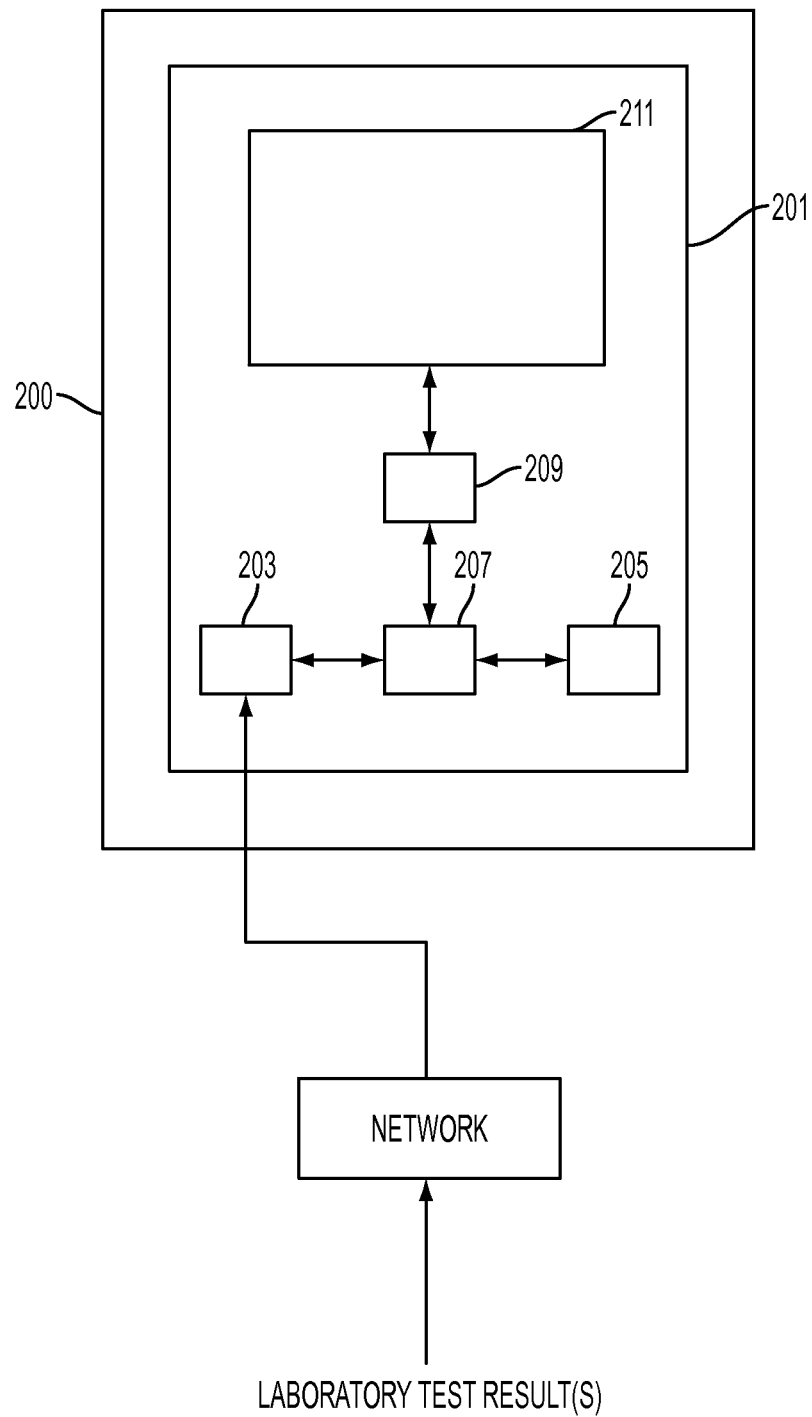
FIG. 2 depicts a block diagram of a system according to an embodiment of the present invention.

Referring now to FIG. 2, a system 201 for predicting a time of failure of a device 200 (the system being integrated in a centralized manner into the device) is shown. As seen in this FIG. 2, the system 201 may comprise: a receiving element 203 configured to receive at least one laboratory test result; a first generating element 205 configured to generate at least one physical measurement associated with the device; a determining element 207 in operative communication with the receiving element and the first generating element configured to determine a difference between information associated with the at least one received laboratory test result and information associated with the at least one generated physical measurement; a second generating element 209 in operative communication with the determining element configured to generate a predicted time of failure of the device, wherein the generation of the predicted time of failure of the device is based at least in part upon the determined difference between the information associated with the at least one received laboratory test result and the information associated with the at least one generated physical measurement; and an outputting element 211 in operative communication with the second generating element configured to output the predicted time of failure of the device (in various examples, the outputting element may comprise a visual outputting element (such as a display screen or the like) and/or an audio outputting element (such as a speaker or the like).

In one example, any steps may be carried out in the order recited or the steps may be carried out in another order.

Still referring to FIG. 2, any communications (e.g., receiving by the receiving element at least one laboratory test result) may be carried out via a network. Such a network may comprise the Internet, an intranet, a local area network, a wide area network and/or any other desired communication channel(s). In another example, some or all of the elements of FIG. 2 may be implemented in a computer system of the type shown in FIG. 5. Further, any element may be in operative communication with any other element(s).

Figure 3:
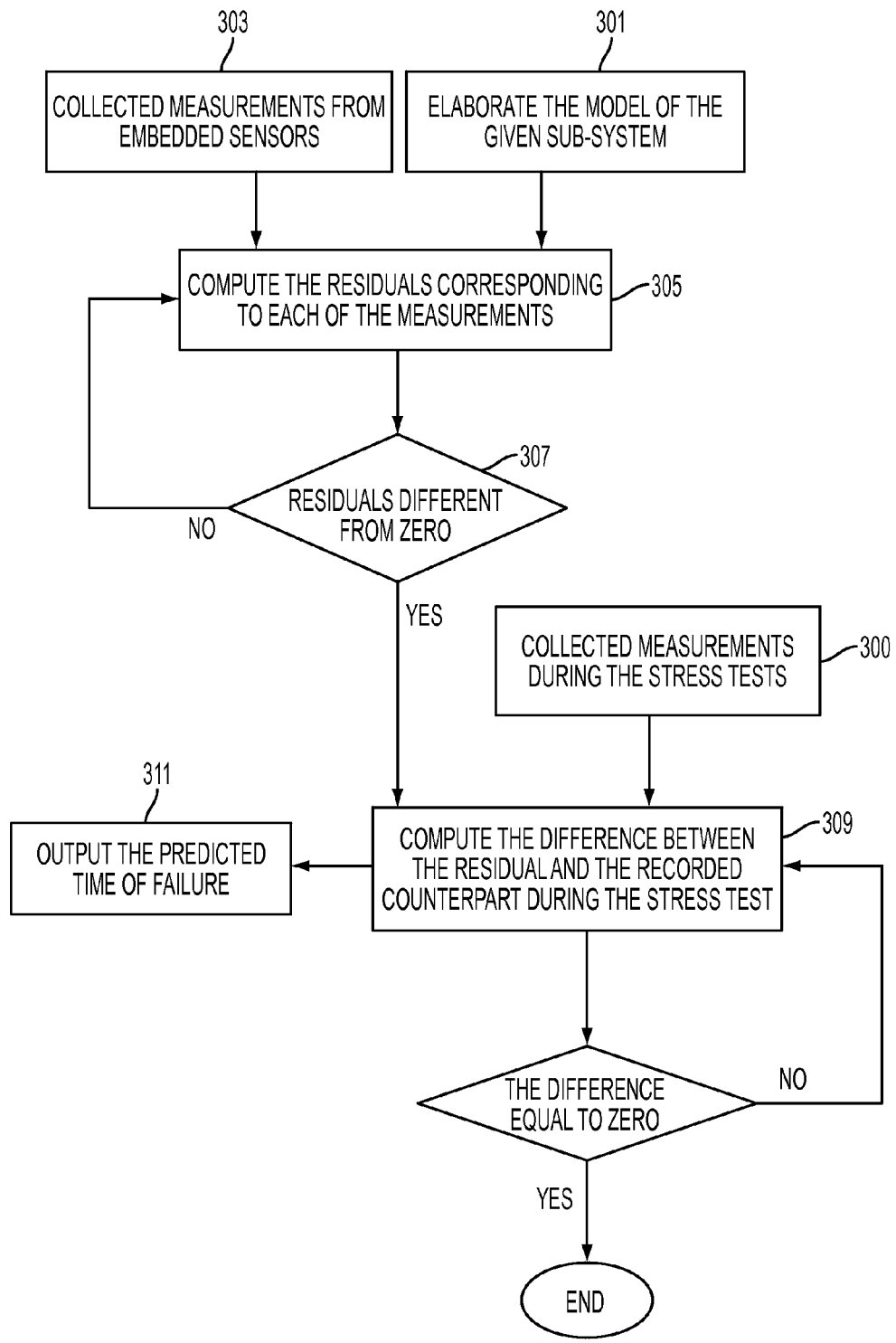
FIG. 3 depicts a flowchart of a method according to an embodiment of the present invention.

Referring now to FIG. 3, a flowchart of another example method for predicting a time of failure of a device is shown. In one example, these steps may be applied to each of a plurality of subsystems within the device and then the results aggregated and analyzed as described below. In any case, at step 300 one or more measurements are collected during one or more stress tests (e.g., laboratory stress tests of a given device type and/or field stress tests of a given device type). Further, at step 301 a model for the given subsystem is elaborated, that is, defined (the model may be based on one or more mathematical equations and/or one or more databases). In addition, at step 303, measurement(s) from one or more sensors embedded in the device are collected (in various examples, one or more sensors embedded in the device may acquire measurements for temperature, current, voltage, acceleration, tension and/or electro-magnetic field).

Still referring to FIG. 3, at step 305 for each measurement a corresponding residual is computed. In this context, a residual is a difference between a measurement (e.g., collected from an embedded sensor) and its equivalent calculated from an elaborated model. At step 307 a determination is made whether a given residual differs from zero (in this example, the value of a residual is a fault indicator such that when the residual is equal to zero there is no fault and when the residual is not equal to zero there is a fault). In the case of no residuals being different from zero, processing may loop back to step 305. In the case of at least one residual being different from zero, processing may proceed to step 309.

Still referring to FIG. 3, at step 309 a difference between each residual and a counterpart recorded during the stress test(s) is computed (e.g., real-time acceleration measurements at the device vs. counterpart stress test acceleration measurements). In this example, the amplitude of the difference provides a failure prediction for the subsystem (and by extension, the device). In one specific example, when the difference is equal to zero, this corresponds to the actual time when the subsystem breaks down. At step 311 an output (e.g., visual output on a display and/or audio output via a speaker) of the predicted time of failure is made (wherein the prediction is based, for example, on the magnitude of the difference computed at step 309).

Figure 4:
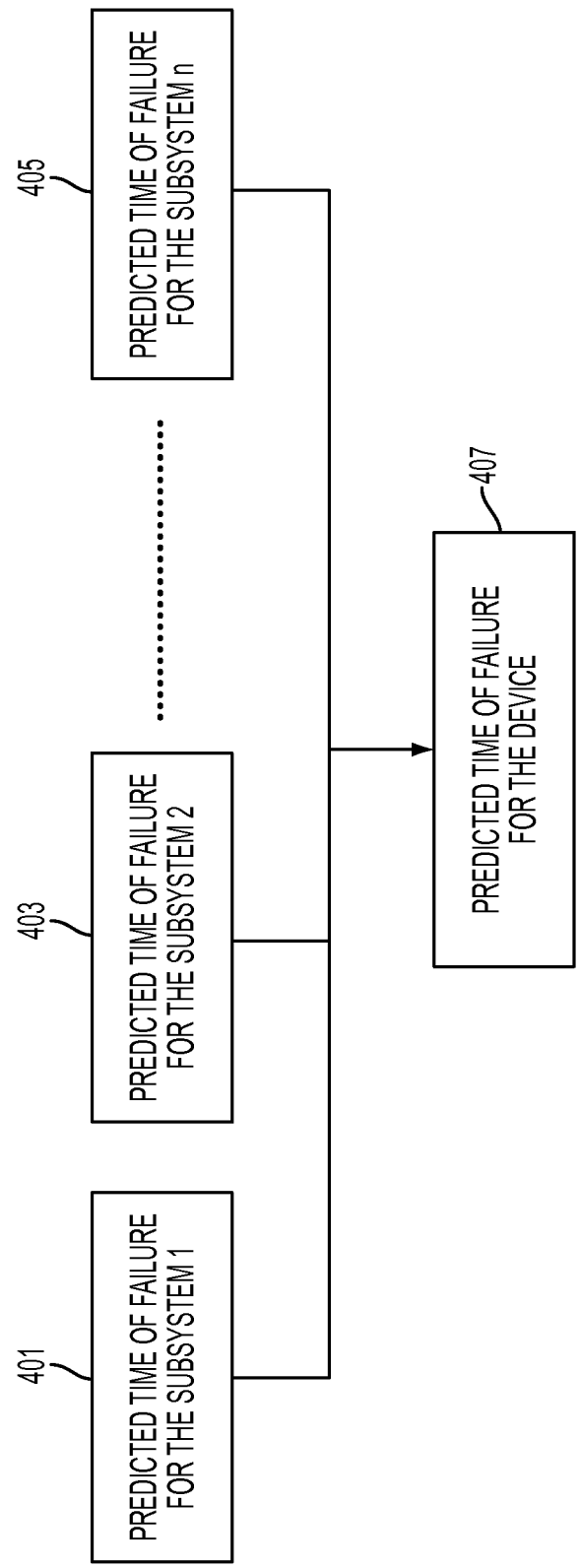
FIG. 4 depicts a flowchart of a method according to an embodiment of the present invention.

Referring now to FIG. 4, a block diagram according to one embodiment depicting how results corresponding to each of a plurality of subsystems are aggregated to produce a global prediction of the time of failure of a device is shown. As seen in this FIG. 4, in one example, a predicted time of failure for subsystem 1 of a device (see block 401), a predicted time of failure for subsystem 2 of the device (see block 403) and a predicted time of failure for subsystem n (wherein n is any desired integer) of a device (see block 405) are aggregated to determine a predicted time of failure for the device (see block 407). In one specific example, the predicted time of failure for the device will be the earliest time of failure of any of the subsystems of the device.

Reference will now be made to an example prediction of a time of failure. In this example, the first step is to use Kalman filtering to estimate the state and to compute residuals. We consider the case where the model of each sub-system can be represented under a state space:

$$\begin{cases} x_k = F_k x_{k-1} + G_k u_k + w_k \\ z_k = H_k x_k + v_k \end{cases}$$

where:
k is the discrete time instant
$x_k$ is the state of the sub-system
$F_k$ is the state transition matrix
$G_k$ is the control-input matrix, applied to the control vector $u_k$
$w_k$ is the sub-system Gaussian noise
$v_k$ is the sensors Gaussian noise
$H_k$ is the information matrix
$z_k$ is the sensors measurements In this example, a linear Kalman filter can be used, however based on the structure of the models various extensions of the Kalman filter can be used as well. An example of the use of Kalman filter for the time of failure prediction can be to determine first the state estimate and the covariance estimate a priori, then update the different variables:

$$\hat{x}_{k|k-1} = F_k \hat{x}_{k-1|k-1} + G_{k-1} u_{k-1}$$

$$P_{k|k-1} = F_k P_{k-1|k-1} F_k^T + Q_k$$

Then the update of the parameters is achieved as follows:

$$\tilde{y}_k = z_k - H_k \hat{x}_{k|k-1}$$

$$S_k = H_k P_{k|k-1} H_k^T + R_k$$

$$K_k = P_{k|k-1} H_k^T S_k^{-1}$$

$$\hat{x}_{k|k} = \hat{x}_{k|k-1} + K_k \tilde{y}_k$$

$$P_{k|k} = (I - K_k H_k) P_{k|k-1}$$

where:
$S_k$ is the innovation
$K_k$ is the kalman gain
$x_k$ is the state estimate
$P_k$ is the covariance estimate In the classical Kalman filter settings the residual is given by $$\tilde{y}_k = z_k - H_k \hat{x}_{k|k-1}$$

This equation allows the determination of the prediction of the time of failure $Tof_k$ by computing the difference between the residual $\tilde{y}_k$ and the threshold $\sigma$ obtained during the stress test.

$$Tof_k = \tilde{y}_k - \sigma$$

The same approach can be applied by using an extension of the Kalman filter, such as Extended Kalman filter, unscented Kalman Filter, particle filter and so on, or by using spectral analysis methods or data-based methods.

Figure 5:
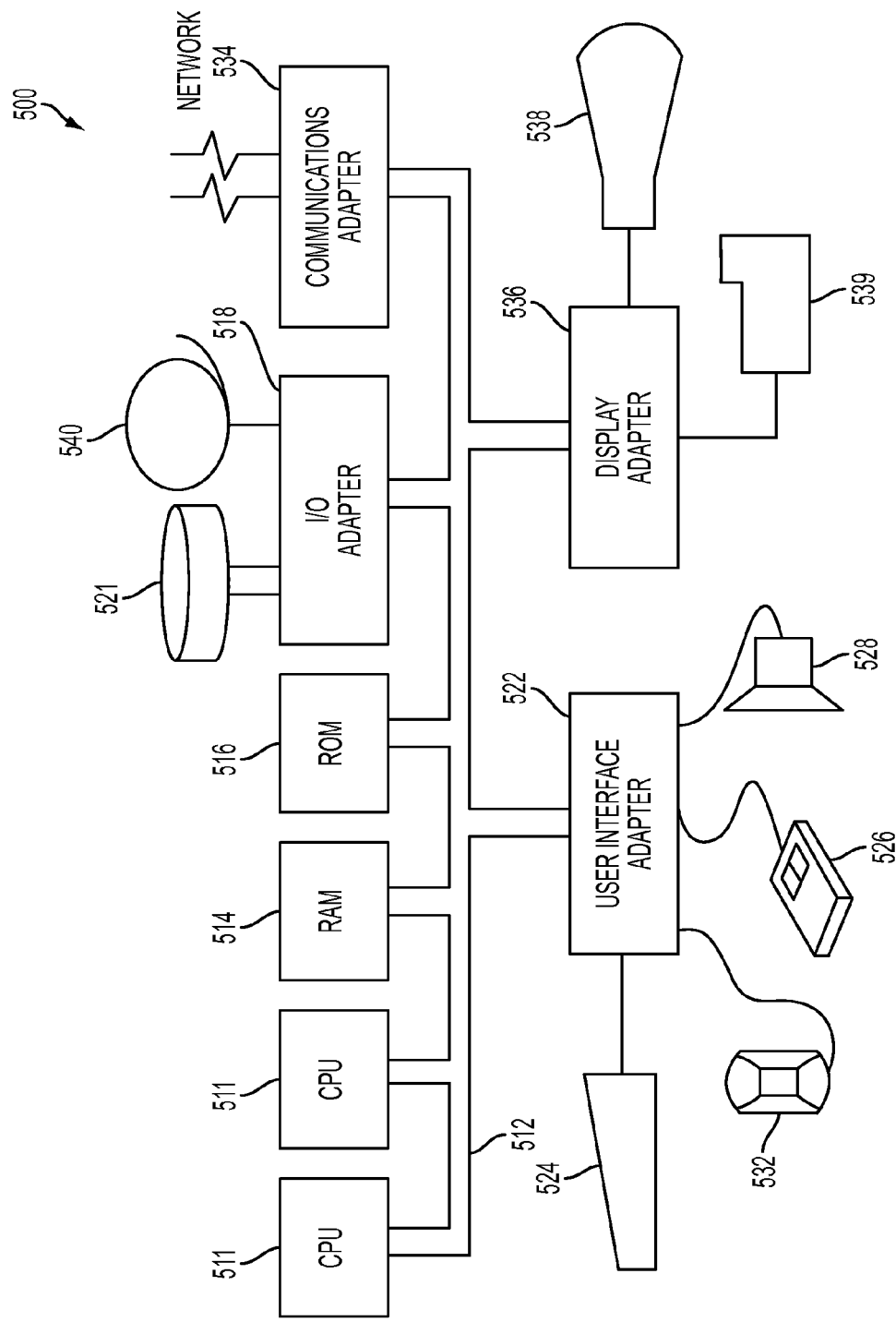
FIG. 5 depicts a block diagram of a system according to an embodiment of the present invention.

Referring now to FIG. 5, this figure shows a hardware configuration of computing system 500 according to an embodiment of the present invention. As seen, this hardware configuration has at least one processor or central processing unit (CPU) 511. The CPUs 511 are interconnected via a system bus 512 to a random access memory (RAM) 514, read-only memory (ROM) 516, input/output (I/O) adapter 518 (for connecting peripheral devices such as disk units 521 and tape drives 540 to the bus 512), user interface adapter 522 (for connecting a keyboard 524, mouse 526, speaker 528, microphone 532, and/or other user interface device to the bus 512), a communications adapter 534 for connecting the system 500 to a data processing network, the Internet, an Intranet, a local area network (LAN), etc., and a display adapter 536 for connecting the bus 512 to a display device 538 and/or printer 539 (e.g., a digital printer or the like).

In another embodiment, a method implemented in a device for predicting a time of failure of the device is provided, the method comprising: receiving by the device at least one laboratory test result; generating by the device at least one physical measurement associated with the device; determining by the device a difference between information associated with the at least one received laboratory test result and information associated with the at least one generated physical measurement; generating by the device a predicted time of failure of the device, wherein the generation of the predicted time of failure of the device is based at least in part upon the determined difference between the information associated with the at least one received laboratory test result and the information associated with the at least one generated physical measurement; and outputting by the device the predicted time of failure of the device.

In one example, the at least one laboratory test result is a test result of a laboratory stress test associated with the device.

In another example, the at least one physical measurement is selected from the group comprising: a temperature measurement; a current measurement; a voltage measurement; an acceleration measurement; a tension measurement; a compression measurement; a force measurement; a magnetic field measurement; and an electro-magnetic field measurement.

In another example, the at least one physical measurement is made in real-time.

In another example, the output is made to a display screen associated with the device.

In another example, the method further comprises: receiving by the device a plurality of laboratory test results; generating by the device a plurality of physical measurements associated with the device; and determining by the device a difference between information associated with the plurality of received laboratory test results and information associated with the plurality of generated physical measurements; wherein the generation of the predicted time of failure of the device is based at least in part upon the determined difference between information associated with the plurality of received laboratory test results and information associated with the plurality of generated physical measurements.

In another example: each of the plurality of laboratory test results is received at different times; and each of the plurality of physical measurements is generated at different times.

In another example, the device is selected from the group comprising: a smart phone; a tablet; a laptop computer; a desktop computer; a refrigerator; a freezer; a stove; a range; a hot water heater; a boiler; a furnace; and a vehicle mounted device.

In another example, the information associated with the at least one generated physical measurement comprises a difference between the at least one generated physical measurement and at least one value from a model.

In another example, the information associated with the at least one generated physical measurement is the at least one generated physical measurement itself.

In another embodiment, a computer readable storage medium, tangibly embodying a program of instructions executable by a device predicting a time of failure of the device is provided, the program of instructions, when executing, performing the following steps: receiving by the device at least one laboratory test result; generating by the device at least one physical measurement associated with the device; determining by the device a difference between information associated with the at least one received laboratory test result and information associated with the at least one generated physical measurement; generating by the device a predicted time of failure of the device, wherein the generation of the predicted time of failure of the device is based at least in part upon the determined difference between the information associated with the at least one received laboratory test result and the information associated with the at least one generated physical measurement; and outputting by the device the predicted time of failure of the device.

In one example, the at least one laboratory test result is a test result of a laboratory stress test associated with the device.

In another example, the at least one physical measurement is selected from the group comprising: a temperature measurement; a current measurement; a voltage measurement; an acceleration measurement; a tension measurement; a compression measurement; a force measurement; a magnetic field measurement; and an electro-magnetic field measurement.

In another example, the at least one physical measurement is made in real-time.

In another example, the output is made to a display screen associated with the device.

In another example, the program of instructions, when executing, further performs the steps of: receiving by the device a plurality of laboratory test results; generating by the device a plurality of physical measurements associated with the device; and determining by the device a difference between information associated with the plurality of received laboratory test results and information associated with the plurality of generated physical measurements; wherein the generation of the predicted time of failure of the device is based at least in part upon the determined difference between information associated with the plurality of received laboratory test results and information associated with the plurality of generated physical measurements.

In another example: each of the plurality of laboratory test results is received at different times; and each of the plurality of physical measurements is generated at different times.

In another example, the device is selected from the group comprising: a smart phone; a tablet; a laptop computer; a desktop computer; a refrigerator; a freezer; a stove; a range; a hot water heater; a boiler; a furnace; and a vehicle mounted device.

In another example, the information associated with the at least one generated physical measurement comprises a difference between the at least one generated physical measurement and at least one value from a model.

In another example, the information associated with the at least one generated physical measurement is the at least one generated physical measurement itself.

In another embodiment, a system for predicting a time of failure of a device, the system being integrated into the device is provided, the system comprising: a receiving element configured to receive at least one laboratory test result; a first generating element configured to generate at least one physical measurement associated with the device; a determining element in operative communication with the receiving element and the first generating element configured to determine a difference between information associated with the at least one received laboratory test result and information associated with the at least one generated physical measurement; a second generating element in operative communication with the determining element configured to generate a predicted time of failure of the device, wherein the generation of the predicted time of failure of the device is based at least in part upon the determined difference between the information associated with the at least one received laboratory test result and the information associated with the at least one generated physical measurement; and an outputting element in operative communication with the second generating element configured to output the predicted time of failure of the device.

In one example, the at least one laboratory test result is a test result of a laboratory stress test associated with the device.

In another example, the at least one physical measurement is selected from the group comprising: a temperature measurement; a current measurement; a voltage measurement; an acceleration measurement; a tension measurement; a compression measurement; a force measurement; a magnetic field measurement; and an electro-magnetic field measurement.

In another example, the at least one physical measurement is made in real-time.

In another example, the outputting element comprises a display screen associated with the device.

In another example: the receiving element is configured to receive a plurality of laboratory test results; the first generating element is configured to generate a plurality of physical measurements associated with the device; and the determining element is further configured to determine a difference between information associated with the plurality of received laboratory test results and information associated with the plurality of generated physical measurements; wherein the generation of the predicted time of failure of the device is based at least in part upon the determined difference between information associated with the plurality of received laboratory test results and information associated with the plurality of generated physical measurements.

In another example, the information associated with the at least one generated physical measurement is the at least one generated physical measurement itself.

In another example: each of the plurality of laboratory test results is received at different times; and each of the plurality of physical measurements is generated at different times.

In another example, the device is selected from the group comprising: a smart phone; a tablet; a laptop computer; a desktop computer; a refrigerator; a freezer; a stove; a range; a hot water heater; a boiler; a furnace; and a vehicle mounted device.

In another example, the information associated with the at least one generated physical measurement comprises a difference between the at least one generated physical measurement and at least one value from a model.

In another example, the information associated with the at least one generated physical measurement is the at least one generated physical measurement itself.

In various examples, a monitoring approach is developed for each subsystem, where the ultimate objective is to diagnose first the potential failures of subsystems and then to predict the date of failure of the entire device. The diagnosis may be performed through the detection, the localization and the characterization of failure(s). The detection may be conducted by computing residuals which are failure indicators. The residuals may be constructed by comparing the measurements obtained from laboratory stress tests to those recorded by embedded sensors. In one specific example, the predicted time of failure obtained from the stress tests will remain intact provided that the residuals are equal to zero in terms of mean. The deviation of residuals from zero may provide an amplitude which will be a function of the time of failure of a device. In one specific example, a fault diagnosis strategy based on residual calculation obtained from models may be a fault indicator (e.g., only in the case where the fault is characterized by the mean-deviation of measurements). However, there are some failures which cannot be diagnosed by the residual computation process using physical models. In such scenarios, a frequency components analysis may be used. This may comprise computing frequency components of some signals during the stress tests and repeating the same process with the recorded data (by accelerometers, for example). Then, the objective is to isolate the same band of frequencies in both cases and establish a comparison, which gives a residual. When the obtained residual deviates from zero in this example, this will be a fault indicator. The combination of the various results obtained from the various models and methods will indicate the time of failure of a device.

The monitoring performed for each subsystem may be combined with module(s) transmitting the outcomes of the monitoring process to a centralized system (e.g., a centralized system disposed on a given device). The centralized system combines all of the received information for processing. Then, the time of failure of the entire device is predicted and transferred to a display system. The display system may express the time of failure in terms of, for example, days, months or years or according to a given format available to a user (the user may be provided a mechanism to select and/or change the format). For systems which are not ordinarily embedded with a display system, a display system can be added for this purpose. The displayed prediction, besides indicating the time of failure of the entire device may indicate to the user the reason(s) for the failure(s) and/or the component(s) that will lead to the failure(s). Further, when component(s) are replaced by new ones (and/or repaired) the user may be provided an indication of what will become the updated predicted time of failure of the entire device.

As described herein, mechanisms are provided for indicating to a user the status of the user's devices and a decrease of the devices' performance, quantified in terms of life expectancy.

As described herein, mechanisms are provided to help avoid sudden and unexpected breakdown of devices that may have detrimental consequences (e.g., loss of critical information such as on a laptop computer or desktop computer).

As described herein, mechanisms are provided to allow planning ahead and predictive maintenance that will increase the life duration of devices, for example, by replacing the components that will lead to failures.

When a device is purchased the life duration of the device is at its highest level and, over time, the life duration will decrease due to the different activities that the device may be subjected to. As described herein, mechanisms are provided to permit a user (e.g., a purchaser of a device) to monitor the status of the device.

In one example, one or more algorithms may be implemented in such a manner as to operate in real-time. Therefore, in this example, there is no need to store a large amount of data, which avoids high memory requirements.

In various examples, mechanisms may be provided to monitor key indicators of failures (via measurements). In these examples, the amplitude of such key indicators is function of a device's life expectancy (as new data arrives, these amplitudes may be regularly updated (e.g., periodically every hour, every day, every month) to generate updated predictions of time of failure).

As described herein, prediction of the time of failure of a device may be made by using a set of measurements (such as temperature(s), current(s), tension(s), environmental variable(s) and/or acceleration(s)).

As described herein, a device that ordinarily does not have a display system may have such a display system incorporated therein for the purpose of providing to a user a device status (e.g., when the devices will fail or breakdown).

As described herein, various embodiments may combine two sets of information—those obtained during baseline laboratory stress tests (e.g., current, tension, temperature measurements) with their counterparts recorded while the device is operating (and this for each subsystem of the device). After determining the predicted time of failure of each subsystem, a centralized system may estimate the predicted time of failure of the device. The predicted time of failure may be displayed by a display system according to a format requested by the user. Also, updating the time of failure after a failing component of the device is replaced and/or repaired may be provided.

As described herein, mechanisms are provided that utilize physical subsystems, a centralized system and information obtained from stress field tests as well as those obtained from the actual device (via embedded sensors) to determine a predicted time of failure of the device.

As described herein, mechanisms are provided that use a combination of data coming from laboratory/field tests along with those acquired from the device to determine one or more residuals (which may comprise one or more failure indicators). In various examples, relying on the characteristics of the residuals and the maximum life expectancy of the device, the predicted time of failure may be inferred.

As described herein, in one example, a failure prediction is made by analyzing the state of a subsystem. Such analysis may comprise computing one or more residuals. In the case where the residual(s) are equal to zero a given subsystem is perfectly operating and the predicted time of failure for that subsystem is equal to the one obtained from the stress tests results. On the other hand (that is, when the residua(s) are different from zero), the failure prediction is made by calculating a difference between each residual and its counterpart obtained from the results of the stress tests. The higher a residual, the closer the time of the failure.

In various embodiments, the environments (conditions) in which the stress tests have been performed change when the corresponding measurements are provided by the device sensors (the change may be due, for example, to device mobility and/or the dynamic nature of the device use). In various examples, the prediction algorithm(s) are not dependent on the environments (that is, the same algorithm can be applied when the devices are operating in different environments). In other examples, the prediction algorithm(s) may depend on the nature of a given subsystem (for example, if the characteristics of the subsystem prevent elaboration of a mathematical model of the subsystem, a data base model could be used (or vice versa)).

In other examples, prediction algorithm(s) may comprise: Kalman filtering or its variants (e.g., when elaborating a mathematical model is possible); fast fourier analysis or/and wavelet analysis (with measurements acquired from the actual subsystem to be used, in the case where the elaboration of mathematical models are difficult or impossible).

In other examples, the mechanisms disclosed herein may be applied in the context of one or more of the following: Computer, Desktop; Computer, Embedded Systems; Computer, Laptop; Consumer Device or Appliance, Applications; Consumer Device or Appliance, Audio; Consumer Device or Appliance, General Consumer Device or Appliance, HDTV; Consumer Device or Appliance, Image; Consumer Device or Appliance, Media; Consumer Device or Appliance, Television; Consumer Device or Appliance, User Interface; Consumer Device or Appliance, Video; and/or Converged Communications, Mobile applications.

In other examples, the mechanisms disclosed herein may be implemented in the form of one or more software applications.

In other examples, the mechanisms disclosed herein may be applied to any type of device(s).

Further, in various examples, any desired number of device(s) may be configured for time of failure prediction and/or time of failure diagnosis as described herein.

In other examples, any steps described herein may be carried out in any appropriate desired order.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system". Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any programming language or any combination of one or more programming languages, including an object oriented programming language such as Java, Smalltalk, C++ or the like or a procedural programming language, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention may be described herein with reference to flowchart illustrations and/or block diagrams of methods, systems and/or computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus or other devices provide processes for implementing the functions/acts specified in the flowchart and/or block diagram block or blocks The flowcharts and block diagrams in the figures illustrate the architecture, functionality, and operation of possible implementations of systems, methods and computer program products according to various embodiments of the present invention. In this regard, each block in the flowcharts or block diagrams may represent a module, segment, or portion of code, which comprises one or more executable instructions for implementing the specified logical function(s). It should also be noted that, in some implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

It is noted that the foregoing has outlined some of the objects and embodiments of the present invention. This invention may be used for many applications. Thus, although the description is made for particular arrangements and methods, the intent and concept of the invention is suitable and applicable to other arrangements and applications. It will be clear to those skilled in the art that modifications to the disclosed embodiments can be effected without departing from the spirit and scope of the invention. The described embodiments ought to be construed to be merely illustrative of some of the features and applications of the invention. Other beneficial results can be realized by applying the disclosed invention in a different manner or modifying the invention in ways known to those familiar with the art. In addition, all of the examples disclosed herein are intended to be illustrative, and not restrictive.

What is claimed is:

1. A method implemented in connection with a device for predicting a time of failure of the device, the method comprising:
   receiving by the device at least one laboratory test result, wherein the at least one laboratory test result is a test result of a laboratory stress test associated with the device;
   generating by the device at least one physical measurement associated with the device, wherein the at least one physical measurement is selected from the group comprising: a temperature measurement; a current measurement; a voltage measurement; an acceleration measurement; a tension measurement; a compression measurement; a force measurement; a magnetic field measurement; and an electro-magnetic field measurement;
   determining by the device as a residual a difference between the at least one generated physical measurement and at least one value from a model;
   determining by the device a difference between: (a) information associated with the at least one received laboratory test result; and (b) the residual;
   generating by the device a predicted time of failure of the device, wherein the generation of the predicted time of failure of the device is based at least in part upon an amplitude of the determined difference between: (a) the information associated with the at least one received laboratory test result; and (b) the residual;
   outputting by the device: (a) the predicted time of failure of the device; and (b) an indication of at least one component of the device that is predicted as leading to the failure; and
   providing predictive maintenance by servicing the device via at least one of: (a) repairing the at least one component of the device that is predicted as leading to the failure; and (b) replacing the at least one component of the device that is predicted as leading to the failure.

2. The method of claim 1, wherein the at least one physical measurement is made in real-time.

3. The method of claim 1, wherein the output is made to a display screen associated with the device.

4. The method of claim 1, further comprising:
   receiving by the device a plurality of laboratory test results, wherein each of the plurality of laboratory test results is a test result of a laboratory stress test associated with the device;
   generating by the device a plurality of physical measurements associated with the device;
   determining by the device as a residual a difference between each of the plurality of generated physical measurements and at least one respective value from the model; and
   determining by the device a plurality of differences between: (a) information associated with each of the plurality of received laboratory test results; and (b) each respective residual;
   wherein the generation of the predicted time of failure of the device is based at least in part upon an amplitude of each determined difference between: (a) information associated with each of the plurality of received laboratory test results; and (b) each respective residual.

5. The method of claim 4, wherein:
   each of the plurality of laboratory test results is received at different times; and
   each of the plurality of physical measurements is generated at different times.

6. The method of claim 1, wherein the device is selected from the group comprising: a smart phone; a tablet; a laptop computer; a desktop computer; a refrigerator; a freezer; a stove; a range; a hot water heater; a boiler; a furnace; and a vehicle mounted device.

7. The method of claim 1, wherein:
   the outputting of the indication of at least one component of the device that is predicted as leading to the failure comprises outputting an indication of a plurality of components of the device that are predicted as leading to the failure; and
   the servicing the device comprises at least one of: (a) repairing the plurality of components of the device that are predicted as leading to the failure; and (b) replacing the plurality of components of the device that are predicted as leading to the failure.

8. The method of claim 1, further comprising outputting by the device at least one reason for the predicted failure.

9. The method of claim 1, further comprising outputting by the device, after the servicing, an indication of an updated predicted time of failure of the device.

10. The method of claim 1, wherein:
(i) the receiving by the device at least one laboratory test result, (ii) the generating by the device the at least one physical measurement associated with the device, (iii) the determining by the device as the residual the difference between the at least one generated physical measurement and the at least one value from a model, and (iv) the determining by the device the difference between: (a) the information associated with the at least one received laboratory test result; and (b) the residual are performed for each of a plurality of subsystems of the device; and the generating by the device the predicted time of failure of the device is based upon an aggregation of results of steps (i)-(iv) for each of the plurality of subsystems.

11. The method of claim 10, wherein the predicted time of failure of the device is an earliest predicted time of failure of any of the plurality of subsystems.

12. The method of claim 10, wherein the aggregation is performed by a centralized system of the device.

* * * * *